United States Patent
Miyazaki (10) Patent No.: US 11,581,558 B2
(45) Date of Patent: Feb. 14, 2023

(54) FUEL CELL SYSTEM

(71) Applicant: TOYOTA JIDOSHA KABUSHIKI KAISHA, Toyota (JP)

(72) Inventor: Shinichi Miyazaki, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/544,130

(22) Filed: Dec. 7, 2021

(65) Prior Publication Data

US 2022/0190370 A1 Jun. 16, 2022

(30) Foreign Application Priority Data

Dec. 10, 2020 (JP) .............................. JP2020-205157

(51) Int. Cl.
*H01M 8/04* (2016.01)
*H01M 8/04746* (2016.01)
*H01M 8/0438* (2016.01)

(52) U.S. Cl.
CPC ... *H01M 8/04783* (2013.01); *H01M 8/04432* (2013.01); *H01M 8/04753* (2013.01); *H01M 2250/20* (2013.01)

(58) Field of Classification Search
CPC ......... H01M 8/04783; H01M 8/04432; H01M 8/04753
USPC ........................................................ 429/466
See application file for complete search history.

(56) References Cited

U.S. PATENT DOCUMENTS

| | | | |
|---|---|---|---|
| 5,472,799 A | 12/1995 | Watanabe | |
| 2016/0276681 A1* | 9/2016 | Ikeda | H01M 8/04395 |
| 2019/0181473 A1* | 6/2019 | Lee | H01M 8/04388 |
| 2019/0207235 A1* | 7/2019 | Jang | H01M 8/04197 |
| 2019/0363386 A1* | 11/2019 | Wakita | C25B 1/02 |
| 2020/0185746 A1* | 6/2020 | Iden | H01M 8/0485 |

FOREIGN PATENT DOCUMENTS

| | | |
|---|---|---|
| JP | H06103992 A | 4/1994 |
| JP | H0790111 A | 4/1995 |
| JP | 2014139939 A | 7/2014 |
| WO | 2007038040 A2 | 4/2007 |

* cited by examiner

Primary Examiner — James M Erwin
(74) Attorney, Agent, or Firm — Dickinson Wright, PLLC (57) ABSTRACT

A fuel cell system configured to enhance the life of a fuel cell is provided. The fuel cell system a fuel cell, an oxidant gas supplier configured to supply oxygen-containing oxidant gas to a cathode of the fuel cell, a fuel gas supplier configured to supply hydrogen-containing fuel gas to an anode of the fuel cell, an oxygen partial pressure estimator configured to estimate an oxygen partial pressure of the cathode of the fuel cell, a hydrogen partial pressure estimator configured to estimate a hydrogen partial pressure of the anode of the fuel cell, and a controller, wherein the controller calculates a target hydrogen partial pressure by a given equation (1), and wherein the controller controls the hydrogen partial pressure of the anode to the target hydrogen partial pressure.

2 Claims, 6 Drawing Sheets

FUEL CELL SYSTEM

TECHNICAL FIELD

The disclosure relates to a fuel cell system.

BACKGROUND

A fuel cell (FC) is a power generation device that generates electrical energy by electrochemical reaction between fuel gas (such as hydrogen) and oxidant gas (such as oxygen and air) in a single unit fuel cell or a fuel cell stack (hereinafter, it may be simply referred to as "stack") composed of stacked unit fuel cells (hereinafter may be referred to as "cells"). Hereinafter, fuel gas and oxidant gas may be simply referred to as "reaction gas" or "gas" without any particular distinction.

In general, the unit fuel cells include a membrane electrode assembly (MEA).

The membrane electrode assembly has a structure such that a catalyst layer and a gas diffusion layer are sequentially formed on both surfaces of a solid polymer electrolyte membrane (hereinafter, it may be simply referred to as "electrolyte membrane"). Accordingly, the membrane electrode assembly may be referred to as "membrane electrode gas diffusion layer assembly" (MEGA).

As needed, each unit fuel cell includes two separators sandwiching the membrane electrode gas diffusion layer assembly. In general, the separators have a structure such that a groove is formed as a reaction gas flow path on a surface in contact with the gas diffusion layer. The separators also function as a generated electricity collector.

In the fuel electrode (anode) of the fuel cell, hydrogen ($H_2$) is supplied as fuel gas from the gas flow path and the gas diffusing layer; the supplied hydrogen is protonated by catalytic action of the catalyst layer; and the protonated hydrogen goes to the oxidant electrode (cathode) through the electrolyte membrane. Electrons are generated at the same time, pass through an external circuit, do work, and then go to the cathode. Oxygen ($O_2$) is supplied as oxidant gas to the cathode, and the supplied oxygen reacts with protons and electrons on the cathode, thereby generating water. The generated water gives appropriate humidity to the electrolyte membrane, and excess water permeates through the gas diffusion layer and is discharged to the outside of the system.

There are considerable research on fuel cells configured to be installed and used in a fuel cell vehicle (hereinafter, it may be simply referred to as "vehicle").

For example, Patent Literature 1 discloses the following technique: a composite membrane having a reinforcing layer is used an electrolyte membrane, and to suppress chemical deterioration, an ion exchange material containing carbon particles supporting a Pt-containing catalyst (oxygen reduction reaction (ORR) active catalyst) is disposed at least at one end of the composite membrane. Patent Literature 1 also discloses that the catalyst-supported carbon particles are particularly effective when disposed on the cathode side. The ORR active catalyst means a catalyst by which oxygen reduction reaction (ORR) is accelerated in the cathode of a fuel cell.

Patent Literature 2 discloses that an electronically insulated catalyst layer is disposed in a membrane, and the catalyst layer is located nearer to a cathode side.

Patent Literature 3 discloses that at least one metal catalyst selected from platinum, gold, palladium, rhodium, iridium and ruthenium, is contained in an amount of 0.01% by weight to 80% by weight relative to the weight of a polymer solid electrolyte.

Patent Literature 1: Japanese Patent Application Laid-Open (JP-A) No. 2014-139939

Patent Literature 2: JP-A No. H06-103992

Patent Literature 3: JP-A No. H07-090111

To enhance the life of a fuel cell, there is a demand for a membrane material with better durability.

As a result of evaluating the durability of the electrolyte membrane of Patent Literature 1, it was found that the durability is deteriorated depending on the test condition. It is known that the oxygen reduction reaction of a Pt catalyst changes the selectivity of two-electron reduction by potential. In a fuel cell using an electrolyte membrane mixed with a dispersed Pt catalyst, part of oxygen promotes the generation of hydrogen peroxide in a low potential (hydrogen-rich) environment, thereby advancing the chemical deterioration of the electrolyte membrane. That is, in Patent Literature 1, there is a concern that control for suppressing the generation of hydrogen peroxide at the position where the catalyst-supported carbon particles are disposed, cannot be performed.

SUMMARY

An object of the present disclosure is to provide a fuel cell system configured to enhance the life of a fuel cell.

In a first embodiment, there is provided a fuel cell system comprising:

a fuel cell, an oxidant gas supplier configured to supply oxygen-containing oxidant gas to a cathode of the fuel cell, a fuel gas supplier configured to supply hydrogen-containing fuel gas to an anode of the fuel cell, an oxygen partial pressure estimator configured to estimate an oxygen partial pressure of the cathode of the fuel cell, a hydrogen partial pressure estimator configured to estimate a hydrogen partial pressure of the anode of the fuel cell, and a controller, wherein the fuel cell includes one or more unit fuel cells;

wherein the one or more unit fuel cells include a membrane electrode assembly;

wherein the membrane electrode assembly includes an anode including an anode catalyst layer, an electrolyte membrane, and a cathode including a cathode catalyst layer in this order;

wherein the electrolyte membrane includes a catalyst dispersion portion in the electrolyte membrane, which is arranged in parallel with the anode catalyst layer and the cathode catalyst layer in a layered manner;

wherein the catalyst dispersion portion contains a catalyst;

wherein the controller calculates a target hydrogen partial pressure by the following equation (1):

Target hydrogen partial pressure=[2×Oxygen permeation coefficient in electrolyte membrane thickness direction×{Distance from the anode catalyst layer to the catalyst dispersion portion+ (Electrolyte membrane thickness−Distance from the anode catalyst layer to the catalyst dispersion portion)}×Oxygen partial pressure]÷Hydrogen permeation coefficient in the electrolyte membrane thickness direction;    Equation (1):

and wherein the controller controls the hydrogen partial pressure of the anode to the target hydrogen partial pressure.

The controller may determine whether or not the target hydrogen partial pressure is lower than a lower limit hydrogen partial pressure. When the target hydrogen partial pressure is determined to be lower than the lower limit hydrogen partial pressure, the controller may increase the oxygen partial pressure of the cathode. When the target hydrogen partial pressure is determined to be the lower limit hydrogen partial pressure, the controller may maintain the oxygen partial pressure of the cathode, and it may maintain the hydrogen partial pressure of the anode. When the target hydrogen partial pressure is determined to be higher than the lower limit hydrogen partial pressure, the controller may control the hydrogen partial pressure of the anode to reach the target hydrogen partial pressure.

According to the fuel cell system of the present disclosure, the life of a fuel cell can be enhanced.

BRIEF DESCRIPTION OF THE DRAWINGS

In the accompanying drawings.

DETAILED DESCRIPTION

The fuel cell system of the disclosed embodiments is a fuel cell system comprising:

a fuel cell, an oxidant gas supplier configured to supply oxygen-containing oxidant gas to a cathode of the fuel cell, a fuel gas supplier configured to supply hydrogen-containing fuel gas to an anode of the fuel cell, an oxygen partial pressure estimator configured to estimate an oxygen partial pressure of the cathode of the fuel cell, a hydrogen partial pressure estimator configured to estimate a hydrogen partial pressure of the anode of the fuel cell, and a controller, wherein the fuel cell includes one or more unit fuel cells;

wherein the one or more unit fuel cells include a membrane electrode assembly;

wherein the membrane electrode assembly includes an anode including an anode catalyst layer, an electrolyte membrane, and a cathode including a cathode catalyst layer in this order;

wherein the electrolyte membrane includes a catalyst dispersion portion in the electrolyte membrane, which is arranged in parallel with the anode catalyst layer and the cathode catalyst layer in a layered manner;

wherein the catalyst dispersion portion contains a catalyst;

wherein the controller calculates a target hydrogen partial pressure by the following equation (1):

$$\text{Target hydrogen partial pressure} = [2 \times \text{Oxygen permeation coefficient in electrolyte membrane thickness direction} \times \{\text{Distance from the anode catalyst layer to the catalyst dispersion portion} + (\text{Electrolyte membrane thickness} - \text{Distance from the anode catalyst layer to the catalyst dispersion portion})\} \times \text{Oxygen partial pressure}] \div \text{Hydrogen permeation coefficient in the electrolyte membrane thickness direction};$$

Equation (1):

and wherein the controller controls the hydrogen partial pressure of the anode to the target hydrogen partial pressure.

Figure 1:
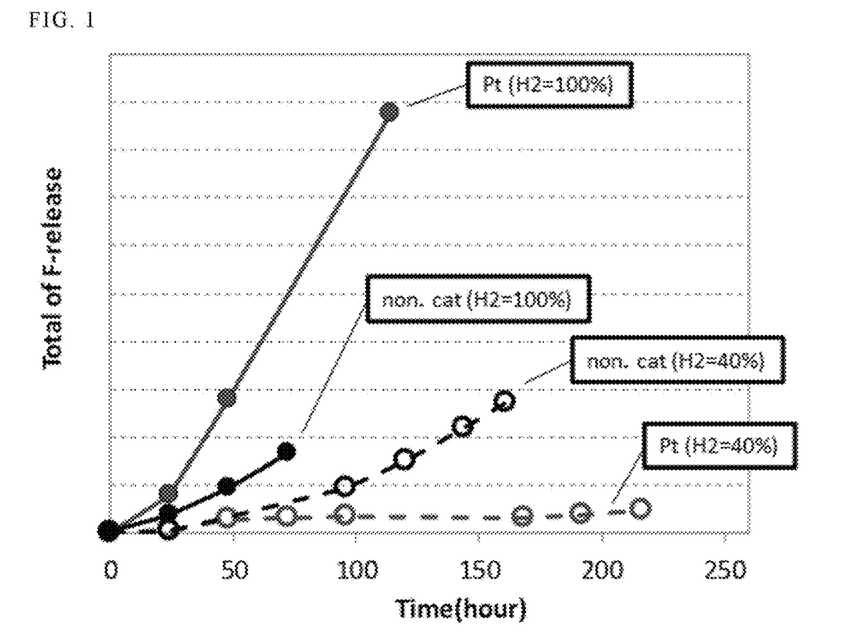
FIG. 1 is a graph showing the relationship between the amount of discharged fluorine ions and time in a high potential durability test.

FIG. 1 is a graph showing the relationship between the amount of discharged fluorine ions and time in a high potential durability test.

Durability evaluation of an electrolyte membrane containing a conventional Pt catalyst, was carried out. As a result, as shown in FIG. 1, it was found that the durability performance deteriorated depending on the test conditions. This is understood to be due to the following reasons. It is known that the oxygen reduction reaction of the Pt catalyst changes the selectivity of two-electron reduction by potential. In a fuel cell using an electrolyte membrane mixed with a dispersed catalyst, part of oxygen becomes hydrogen peroxide, which is a substance causing the chemical deterioration of the electrolyte membrane, in a low potential ($H_2$ rich) environment.

Figure 2:
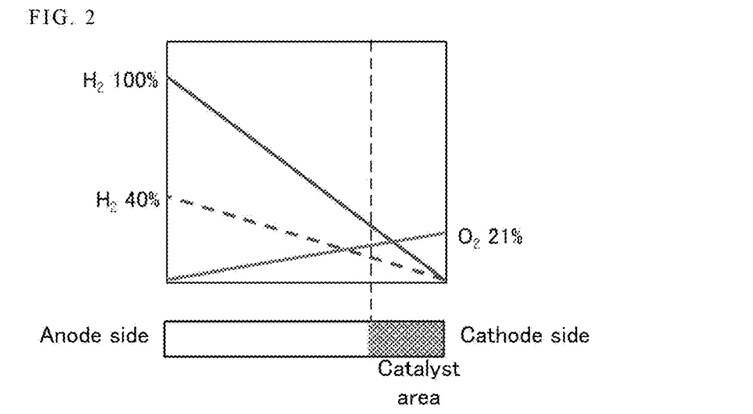
FIG. 2 is a diagram illustrating an example of oxygen and hydrogen concentrations in an electrolyte membrane.

FIG. 2 is a diagram illustrating an example of oxygen and hydrogen concentrations in an electrolyte membrane.

As shown in FIG. 2, in the condition of a hydrogen concentration of 100%, a part of the catalyst added region in the electrolyte membrane includes a region in which hydrogen concentration is higher than oxygen concentration. The durability of the fuel cell seems to be lowered by this reason.

It was found that in a fuel cell in which a catalyst is added to an electrolyte membrane in order to suppress the chemical deterioration of the electrolyte membrane, a remarkable difference occurs in the effect of suppressing the deterioration depending on the addition position of the catalyst with respect to the membrane thickness and the operating environment (hydrogen partial pressure and oxygen partial pressure). Accordingly, in the disclosed embodiments, the upper limit of the hydrogen partial pressure of the anode is calculated and used as the control target value to maximize the deterioration suppressing effect.

In the disclosed embodiments, the hydrogen partial pressure in the electrolyte membrane is controlled based on the target hydrogen partial pressure that uses, as a parameter, the position of the catalyst-containing catalyst dispersion portion disposed in the electrolyte membrane (a distance from the catalyst layer).

According to the disclosed embodiments, the hydrogen partial pressure and the oxygen partial pressure can be appropriately set in accordance with the catalyst addition position; the generation of hydrogen peroxide in the catalyst added to the electrolyte membrane can be suppressed; and the chemical deterioration of the electrolyte membrane can be effectively suppressed by the operation of reducing crossover oxygen to the anode. As a result, the durability of the electrolyte membrane and the life of the fuel cell are enhanced.

The fuel cell system of the present disclosure includes at least the fuel cell, the fuel gas supplier, the oxidant gas supplier, the oxygen partial pressure estimator, the hydrogen partial pressure estimator, and the controller.

In general, the fuel cell system of the present disclosure is installed and used in a fuel cell vehicle including a motor as a driving source.

The fuel cell system of the disclosed embodiments may be installed and used in a vehicle that can be run by the power of a secondary cell.

The motor is not particularly limited. It may be a conventionally-known driving motor.

The fuel cell may be a fuel cell composed of only one unit fuel cell, or it may be a fuel cell stack composed of stacked unit fuel cells.

The number of stacked unit fuel cells is not particularly limited. For example, two to several hundred unit fuel cells may be stacked, or 2 to 200 unit fuel cells may be stacked.

The fuel cell stack may include an end plate at both stacking-direction ends of each unit fuel cell.

Each unit fuel cell includes at least a membrane electrode assembly.

The membrane electrode assembly includes the anode including the anode catalyst layer, the electrolyte membrane, and the cathode including the cathode catalyst layer in this order. The membrane electrode assembly may include an anode-side gas diffusion layer, the anode catalyst layer, the electrolyte membrane, the cathode catalyst layer, and a cathode-side gas diffusion layer in this order.

The cathode (oxidant electrode) includes the cathode catalyst layer. The cathode may include the cathode-side gas diffusion layer.

The anode includes the anode catalyst layer. The anode may include the anode-side gas diffusion layer.

The cathode catalyst layer and the anode catalyst layer are collectively referred to as "catalyst layer".

The catalyst layer may contain a catalyst metal for accelerating an electrochemical reaction, a proton-conducting electrolyte, or electron-conducting carbon particles, for example.

As the catalyst metal, for example, platinum (Pt) or an alloy of Pt and another metal (such as Pt alloy mixed with cobalt, nickel or the like) may be used.

The electrolyte may be fluorine resin or the like. As the fluorine resin, for example, a Nafion solution or the like may be used.

The catalyst metal is supported on carbon particles. In each catalyst layer, the electrolyte and the carbon particles supporting the catalyst metal (i.e., catalyst particles) may be mixed.

As the carbon particles for supporting the catalyst metal (i.e., supporting carbon particles), for example, water-repellent carbon particles obtained by enhancing the water repellency of commercially-available carbon particles (carbon powder) by heating, may be used.

The cathode-side gas diffusion layer and the anode-side gas diffusion layer are collectively referred to as "gas diffusion layer".

The gas diffusion layer may be a gas-permeable, electroconductive member or the like.

As the electroconductive member, examples include, but are not limited to, a porous carbon material such as carbon cloth and carbon paper, and a porous metal material such as metal mesh and foam metal.

The electrolyte membrane includes a catalyst dispersion portion.

The catalyst dispersion portion is arranged in parallel and layered with the anode catalyst layer and the cathode catalyst layer in the electrolyte membrane.

The electrolyte membrane may be a solid polymer electrolyte membrane. As the solid polymer electrolyte membrane, examples include, but are not limited to, a hydrocarbon electrolyte membrane and a fluorine electrolyte membrane such as a moisture-containing, thin perfluorosulfonic acid membrane. The electrolyte membrane may be a Nafion membrane (manufactured by DuPont), for example.

The catalyst dispersion portion contains a catalyst. The catalyst may be an oxygen reduction reaction (ORR) active catalyst. The oxygen reduction reaction (ORR) active catalyst may be the above catalyst metal. The catalyst dispersion portion may contain the above electrolyte.

The arrangement position of the catalyst dispersion portion may be appropriately set according to the operating conditions of the fuel cell.

As needed, each unit fuel cell may include two separators sandwiching the membrane electrode assembly. One of the two separators is an anode-side separator, and the other is a cathode-side separator. In the disclosed embodiments, the anode-side separator and the cathode-side separator are collectively referred to "separator".

The separator may include supply and discharge holes for delivering the reaction gas and the refrigerant in the unit fuel cell stacking direction. As the refrigerant, for example, a mixed solution of ethylene glycol and water may be used to prevent freezing at low temperature. The reaction gas is the fuel gas or the oxidant gas. The fuel gas may be hydrogen or the like. The oxidant gas may be oxygen, air, dry air, or the like.

As the supply hole, examples include, but are not limited to, a fuel gas supply hole, an oxidant gas supply hole, and a refrigerant supply hole.

As the discharge hole, examples include, but are not limited to, a fuel gas discharge hole, an oxidant gas discharge hole, and a refrigerant discharge hole.

The separator may include one or more fuel gas supply holes, one or more oxidant gas supply holes, one or more refrigerant supply holes, one or more fuel gas discharge holes, one or more oxidant gas discharge holes, one or more oxidant gas discharge holes, and one or more refrigerant discharge holes.

The separator may have a reactant gas flow path on a surface in contact with the gas diffusion layer. Also, on the opposite surface to the surface in contact with the gas diffusion layer, the separator may have a refrigerant flow path for keeping the temperature of the fuel cell at a constant level.

When the separator is the anode-side separator, it may include one or more fuel gas supply holes, one or more oxidant gas supply holes, one or more refrigerant supply holes, one or more fuel gas discharge holes, one or more oxidant gas discharge holes, and one or more refrigerant discharge holes. On the surface in contact with the anode-side gas diffusion layer, the anode-side separator may have a fuel gas flow path for delivering the fuel gas from the fuel gas supply hole to the fuel gas discharge hole. On the opposite surface to the surface in contact with the anode side gas diffusion layer, the anode-side separator may have a refrigerant flow path for delivering the refrigerant from the refrigerant supply hole to the refrigerant discharge hole.

When the separator is the cathode-side separator, it may include one or more fuel gas supply holes, one or more oxidant gas supply holes, one or more refrigerant supply holes, one or more fuel gas discharge holes, one or more oxidant gas discharge holes, and one or more refrigerant discharge holes. On the surface in contact with the cathode-side gas diffusion layer, the cathode-side separator may have an oxidant gas flow path for delivering the oxidant gas from the oxidant gas supply hole to the oxidant gas discharge hole. On the opposite surface to the surface in contact with the cathode-side gas diffusion layer, the cathode-side separator may have a refrigerant flow path for delivering the refrigerant from the refrigerant supply hole to the refrigerant discharge hole.

The separator may be a gas-impermeable electroconductive member or the like. The electroconductive member may be, for example, dense carbon in which carbon is compressed to be gas-impermeable, or a press-molded metal (e.g., iron, aluminum, stainless steel, or the like) plate. The separator may have a collecting function.

The fuel cell stack may have a manifold such as an inlet manifold communicating between the supply holes and an outlet manifold communicating between the discharge holes.

As the inlet manifold, examples include, but are not limited to, an anode inlet manifold, a cathode inlet manifold and a refrigerant inlet manifold.

As the outlet manifold, examples include, but are not limited to, an anode outlet manifold, a cathode outlet manifold and a refrigerant outlet manifold.

The fuel cell system includes the fuel gas supplier. The fuel gas supplier supplies the hydrogen-containing fuel gas to the anode of the fuel cell. The fuel gas supplier may supply the fuel gas to the anodes of the fuel cell stack.

The fuel gas is gas that mainly contains hydrogen. For example, it may be hydrogen gas.

As the fuel gas supplier, examples include, but are not limited to, a fuel tank such as a liquid hydrogen tank and a compressed hydrogen tank.

The fuel gas supplier is electrically connected to the controller. The fuel gas supplier is driven by a control signal from the controller. At least one selected from the group consisting of the flow rate and pressure of the fuel gas supplied from the fuel gas supplier to the anode, may be controlled by the controller.

The fuel cell system may include a fuel gas supply flow path.

The fuel gas supply flow path connects the fuel gas supplier and the anode inlet of the fuel cell. The fuel gas supply flow path enables the supply of the fuel gas from the fuel gas supplier to the anode of the fuel cell. The fuel gas supply flow path enables the supply of the fuel gas from the fuel gas supplier to the anodes of the fuel cell stack.

The fuel gas supply flow path may include a fuel gas supply valve.

The fuel gas supply valve enables the control of the flow rate, pressure and so on of the fuel gas supplied to the anode.

The fuel gas supply valve may be electrically connected to the controller, and the flow rate of the fuel gas supplied to the anode and the fuel gas pressure (anode pressure) may be controlled by controlling the opening and closing of the fuel gas supply valve by the controller. By controlling the opening degree of the fuel gas supply valve, the flow rate of the fuel gas supplied to the anode and the fuel gas pressure (anode pressure) may be controlled.

The fuel cell system may include a fuel off-gas discharge flow path.

The fuel off-gas discharge flow path is connected to the anode outlet of the fuel cell.

The fuel off-gas discharge flow path recovers fuel off-gas, which is the fuel gas discharged from the anode of the fuel cell. The fuel off-gas discharge flow path may recover the fuel off-gas discharged from the anodes of the fuel cell stack.

The fuel off-gas contains the following, for example: the fuel gas which has passed through the anode without reacting; water generated in the cathode and then delivered to the anode; corroded substances generated in the catalyst layer, the electrolyte membrane and so on; and oxidant gas which may be supplied to the anode during a purge.

The fuel off-gas discharge flow path may include a fuel off-gas discharge valve.

The fuel off-gas discharge valve enables the discharge of the fuel off-gas to the outside (the outside of the system). The outside may be the outside of the fuel cell system, or it may be the outside of the vehicle. The fuel off-gas discharge valve may be electrically connected to the controller, and the flow rate of the fuel off-gas discharged to the outside may be controlled by controlling the opening and closing of the fuel off-gas discharge valve by the controller. By controlling the opening degree of the fuel off-gas discharge valve, the pressure of the fuel gas supplied to the anode (anode pressure) may be controlled.

The fuel cell system may include a circulation flow path.

The circulation flow path branches from the fuel off-gas discharge flow path and connects to the fuel gas supply flow path. The circulation flow path enables that the recovered fuel off-gas is returned as circulation gas to the anode. Also, the circulation flow path enables the supply of water contained in the recovered fuel off-gas to the anode.

The circulation flow path may join the fuel gas supply flow path at the confluence of the fuel gas supply flow path and the circulation flow path. In the fuel cell system, as needed, the circulation flow path may be provided with an ejector, a circulation pump for controlling the flow rate of the circulating gas (such as a hydrogen pump), and so on.

The circulation pump may be electrically connected to the controller, and the flow rate of the circulating gas may be controlled by controlling the turning on/off, rotational frequency and so on of the circulation pump by the controller.

The ejector may be disposed at the confluence of the fuel gas supply flow path and the circulation flow path, for example. The ejector supplies a gas mixture containing the fuel gas and the circulating gas to the anode of the fuel cell. The ejector may supply the gas mixture to the anodes of the fuel cell stack. As the ejector, a conventionally-known ejector may be used.

The fuel cell system may include an anode gas-liquid separator.

The anode gas-liquid separator is disposed at the bifurcation of the circulation flow path of the fuel off-gas discharge flow path. The anode gas-liquid separator separates the water and fuel gas contained in the fuel off-gas, which is the fuel gas discharged from the anode outlet.

The anode gas-liquid separator recover them and supplies at least one of the recovered water and fuel gas to the anode. The anode gas-liquid separator may be electrically connected to the controller. The opening and closing of the outlet valve of the anode gas-liquid separator may be controlled by controlling the controller. The opening degree of the outlet valve of the anode gas-liquid separator may be controlled by controlling the controller. The amount of water supplied to the anode, the flow rate of the fuel gas, and so on may be controlled thereby.

The fuel cell system includes the oxidant gas supplier.

The oxidant gas supplier supplies the oxygen-containing oxidant gas to the cathode of the fuel cell. The oxidant gas supplier may supply the oxidant gas to the cathodes of the fuel cell stack.

The oxidant gas is oxygen-containing gas. It may be air, dry air, pure oxygen or the like.

As the oxidant gas supplier, for example, an air compressor may be used.

The oxidant gas supplier is electrically connected to the controller. The oxidant gas supplier is driven by a control signal from the controller. At least one selected from the group consisting of the flow rate and pressure of the oxidant gas supplied from the oxidant gas supplier to a cathode, may be controlled by the controller.

The fuel cell system may include an oxidant gas supply flow path.

The oxidant gas supply flow path connects the oxidant gas supplier and the cathode inlet of the fuel cell. The oxidant gas supply flow path enables the supply of the oxidant gas from the oxidant gas supplier to the cathode of the fuel cell. The oxidant gas supply flow path may enable the supply of the oxidant gas from the oxidant gas supplier to the cathodes of the fuel cell stack.

The fuel cell system may include an oxidant off-gas discharge flow path.

The oxidant off-gas discharge flow path is connected to the cathode outlet of the fuel cell. The oxidant off-gas discharge flow path enables the discharge of the oxidant off-gas, which is the oxidant gas discharged from the cathode of the fuel cell, to the outside. The oxidant off-gas discharge flow path may enable the discharge of the oxidant off-gas, which is the oxidant gas discharged from the cathodes of the fuel cell stack, to the outside.

The oxidant off-gas discharge flow path may be provided with an oxidant gas pressure control valve.

The oxidant gas pressure control valve is electrically connected to the controller. By opening the oxidant gas pressure control valve by the controller, the oxidant off-gas, which is the reacted oxidant gas, is discharged to the outside from the oxidant off-gas discharge flow path. By controlling the opening degree of the oxidant gas pressure control valve, the pressure of the oxidant gas supplied to the cathode (cathode pressure) may be controlled.

The fuel gas supply flow path and the oxidant gas supply flow path may be connected via a joining flow path. The joining flow path may be provided with a purge valve.

The purge valve may be electrically connected to the controller. By opening the purge valve by the controller, the oxidant gas in the oxidant gas supplier may be allowed to flow into the fuel gas supply flow path as purge gas.

The purge gas is used for purging. It may be fuel gas, oxidant gas, or a reaction gas mixture containing them.

The fuel cell system may include a refrigerant supplier and a refrigerant circulation flow path as the cooling system of the fuel cell.

The refrigerant circulation flow path communicates between the refrigerant supply hole and refrigerant discharge hole provided in the fuel cell, and it enables that the refrigerant supplied from the refrigerant supplier is circulated in and out of the fuel cell.

The refrigerant supplier is electrically connected to the controller. The refrigerant supplier is driven by a control signal from the controller. The flow rate of the refrigerant supplied from the refrigerant supplier to the fuel cell, is controlled by the controller. The temperature of the fuel cell may be controlled thereby.

As the refrigerant supplier, examples include, but are not limited to, a cooler and a cooling water pump.

The refrigerant circulation flow path may be provided with a radiator for heat dissipation from cooling water.

As the cooling water (refrigerant), for example, a mixed solution of ethylene glycol and water may be used to prevent freezing at low temperature.

The fuel cell system may include a secondary cell.

The secondary cell (battery) may be any chargeable and dischargeable cell. As the secondary cell, examples include, but are not limited to, a nickel-hydrogen secondary cell and a lithium ion secondary cell. The secondary cell may include a power storage element such as an electric double layer capacitor. The secondary cell may have a structure such that a plurality of secondary cells are connected in series. The secondary cell supplies power to the motor, the oxidant gas supplier, and so on. The secondary cell may be chargeable by a power source outside the vehicle, such as a household power source. The secondary cell may be charged by the output power of the fuel cell. The charge and discharge of the secondary cell may be controlled by the controller.

The fuel cell system includes the oxygen partial pressure estimator. The oxygen partial pressure estimator estimates the oxygen partial pressure of the cathode of the fuel cell.

The oxygen partial pressure estimator may be electrically connected to the controller and may be driven according to a control signal from the controller. The oxygen partial pressure estimator may be incorporated in the controller as a program. Accordingly, the controller may also function as the oxygen partial pressure estimator.

The oxygen partial pressure may be estimated by the following method, for example: a data group indicating the relationship between the operating conditions of the fuel cell and the oxygen partial pressure is prepared in advance, and the actual operating conditions of the fuel cell are compared with the data group, thereby estimating the oxygen partial pressure.

The fuel cell system may also include a pressure sensor for sensing the pressure of the oxidant gas in the cathode. The pressure sensor is electrically connected to the controller and provides the measured pressure of the oxidant gas to the controller. The controller may estimate the oxygen partial pressure based on the pressure of the oxidant gas measured by the pressure sensor.

The timing at which the oxygen partial pressure estimator estimates the oxygen partial pressure is not particularly limited, as long as it is after the fuel cell starts power generation.

The fuel cell system includes the hydrogen partial pressure estimator. The hydrogen partial pressure estimator estimates the hydrogen partial pressure of the anode of the fuel cell.

The hydrogen partial pressure estimator may be electrically connected to the controller and may be driven according to a control signal from the controller. The hydrogen partial pressure estimator may be incorporated in the controller as a program. Accordingly, the controller may also function as the hydrogen partial pressure estimator.

The hydrogen partial pressure may be estimated by the following method, for example: a data group indicating the relationship between the operating conditions of the fuel cell and the hydrogen partial pressure is prepared in advance, and the actual operating conditions of the fuel cell are compared with the data group, thereby estimating the hydrogen partial pressure.

The fuel cell system may also include a pressure sensor that senses the pressure of the fuel gas in the anode. The pressure sensor is electrically connected to the controller and provides the measured pressure of the fuel gas to the controller. The controller may estimate the hydrogen partial pressure based on the pressure of the fuel gas measured by the pressure sensor.

The timing at which the hydrogen partial pressure estimator estimates the hydrogen partial pressure is not particularly limited, as long as it is after the fuel cell starts power generation.

The fuel cell system includes the controller.

The controller physically includes a processing unit such as a central processing unit (CPU), a memory device such as a read-only memory (ROM) and a random access memory (RAM), and an input-output interface. The ROM is used to store a control program, control data and so on to be processed by the CPU, and the RAM is mainly used as various workspaces for control processing. Also, the controller may be a control device such as an electronic control unit (ECU).

The controller may be electrically connected to an ignition switch, which may be installed in the vehicle, The controller may be operable by an external power source even if the ignition switch is turned off.

The controller calculates the target hydrogen partial pressure by the following equation (1). The controller controls the hydrogen partial pressure of the anode to the target hydrogen partial pressure.

Equation (1): Target hydrogen partial pressure=[2× Oxygen permeation coefficient in the electrolyte membrane thickness direction×{Distance from the anode catalyst layer to the catalyst dispersion portion÷(Electrolyte membrane thickness−Distance from the anode catalyst layer to the catalyst dispersion portion)}×Oxygen partial pressure]÷Hydrogen permeation coefficient in the electrolyte membrane thickness direction  Equation (1):

$$p^r_{H_2} = 2 \frac{k_{O_2}}{k_{H_2}} \left( \frac{t_{cat}}{t_{mem} - t_{cat}} \right) p_{O_2} \quad (1)$$

The meaning of each character in the above equation (1) is as follows.

k_H$_2$: Hydrogen permeation coefficient (mol/(m·s·kPa)) in the electrolyte membrane thickness direction
Pr_H$_2$: Anode target hydrogen partial pressure (kPa)
k_O$_2$: Oxygen permeation coefficient (mol/(m·s·kPa)) in the electrolyte membrane thickness direction
p_O$_2$: Cathode oxygen partial pressure (kPa)
t_mem: Electrolyte membrane thickness (m)
t_cat: Distance (m) from the anode catalyst layer to the catalyst dispersion portion By calculating the target hydrogen partial pressure by the above equation (1) and controlling the hydrogen partial pressure of the anode to the target hydrogen partial pressure, chemical deterioration of the electrolyte membrane can be effectively suppressed. When the hydrogen partial pressure of the anode exceeds the target hydrogen partial pressure of the equation (1), hydrogen peroxide (H$_2$O), which is a substance causing the deterioration of the electrolyte membrane in the catalyst contained in the electrolyte membrane, is generated.

Figure 3:
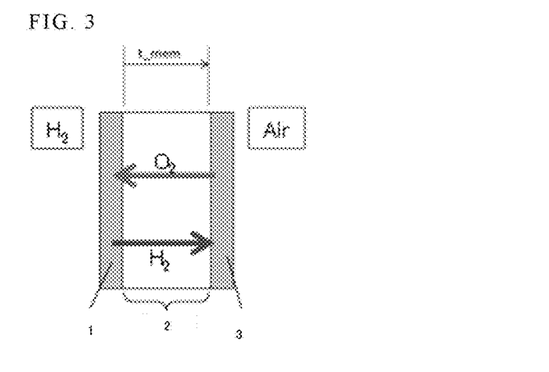
FIG. 3 is a schematic diagram illustrating an example of a conventional membrane electrode assembly.

FIG. 3 is a schematic diagram illustrating an example of a conventional membrane electrode assembly. In FIG. 3, "t_mem" means the electrolyte membrane thickness (m).

Figure 4:
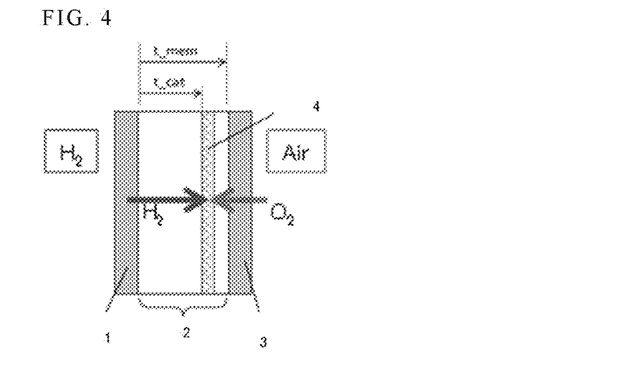
FIG. 4 is a schematic diagram illustrating an example of the membrane electrode assembly used in the disclosed embodiments.

FIG. 4 is a schematic diagram illustrating an example of the membrane electrode assembly used in the disclosed embodiments. In FIG. 4, "t_mem" means the electrolyte membrane thickness (m), and "t_cat" means the distance (m) of the catalyst dispersion portion from the anode catalyst layer.

In FIG. 3, part of O$_2$ permeated through the electrolyte membrane is subjected to two electron reduction in the anode catalyst layer, thereby becoming hydrogen peroxide (H$_2$O$_2$). The hydrogen peroxide becomes free radicals due to Fe ions and the like, and the free radicals oxidize and decompose the polymer of the electrolyte membrane. In FIGS. 4, H$_2$ and O$_2$ permeated from both electrodes react in an oxygen-reduction reaction active catalyst (ORR active catalyst) added to the electrolyte membrane. When H$_2$ flux and O$_2$ flux at the ORR active catalytic position is 2:1, O$_2$ permeated to the anode catalyst layer is substantially zero.

Figure 5:
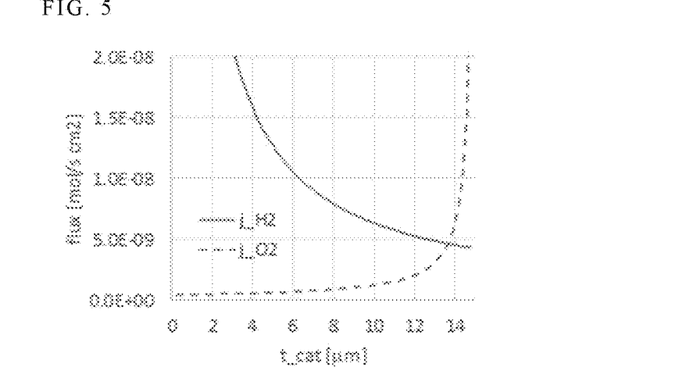
FIG. 5 is a graph showing an example of the relationship between the position of the catalyst in the thickness direction from the anode in the electrolyte membrane and the gas permeation flux of the electrolyte membrane.

FIG. 5 is a graph showing an example of the relationship between the position of the catalyst in the thickness direction from the anode in the electrolyte membrane and the gas permeation flux of the electrolyte membrane. FIG. 5 shows the flux (j_H$_2$) of H$_2$ permeated from the anode at the ORR catalyst position shown below and the flux (j_O$_2$) of O$_2$ permeated from the cathode at the ORR catalyst position shown below. The reaction formula for the formation of water from hydrogen and oxygen is as follows:

2H$_2$+O$_2$=H$_2$O

Accordingly, the ideal hydrogen flux and oxygen flux at the position where the catalyst dispersion portion is arranged, are described as follows:

2jH$_2$=jO$_2$ $$j_{H_2} = \frac{K_{H_2}}{t_{cat}} p_{H_2}$$

j_H$_2$: Hydrogen flux (mol/(m$^2$·s))
k_H$_2$: Hydrogen permeation coefficient (mol/(m·s·kPa)) in the electrolyte membrane thickness direction
p_H$_2$: Anode hydrogen partial pressure (kPa)
t_cat: Distance (m) from the anode catalyst layer to the catalyst dispersion potion $$j_{O_2} = \frac{K_{O_2}}{t_{mem} - t_{cat}} p_{O_2}$$

$j\_O_2$: Oxygen flux mol/(m$^2$·s))
$k\_O_2$: Oxygen permeation coefficient (mol/(m·s·kPa)) in the electrolyte membrane thickness direction
$p\_O_2$: Cathode oxygen partial pressure (kPa)
$t\_mem$: Electrolyte membrane thickness (m)
$t\_cat$: Distance (m) from the anode catalyst layer to the catalyst dispersion portion It will be described how the optimal position of adding the ORR active catalyst in the electrolyte membrane with respect to the operating conditions (the $H_2$ partial pressure and the $O_2$ partial pressure) of the fuel cell is determined, will be described below.

Figure 6:
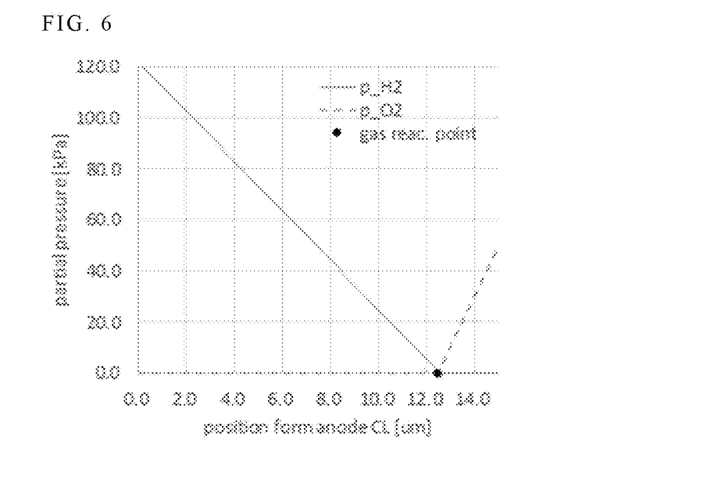
FIG. 6 is a graph showing an example of the case where the position of the catalyst dispersion portion is optimum with respect to the operating conditions of the fuel cell.

FIG. 6 is a graph showing an example of the case where the position of the catalyst dispersion portion is optimum with respect to the operating conditions of the fuel cell.

In the conditions shown in FIG. 6, the hydrogen and oxygen fluxes reacting in the catalyst dispersion portion are described as follows.

$$\text{Hydrogen flux} \times 2 = \text{Oxygen flux}$$

Accordingly, there is no $O_2$ permeating through the anode catalyst layer, and hydrogen peroxide is not generated in the anode catalyst layer.

Figure 7:
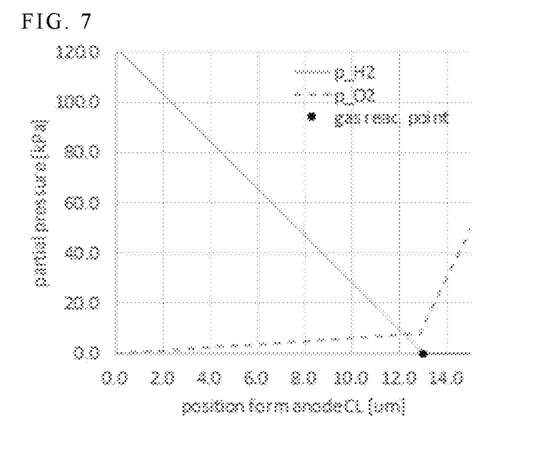
FIG. 7 is a graph showing an example of the case where the catalyst dispersion portion is located on the cathode side than in the case where the position of the catalyst dispersion portion is the optimum position with respect to the operating conditions of the fuel cell.

FIG. 7 is a graph showing an example of the case where the catalyst dispersion portion is located on the cathode side than in the case where the position of the catalyst dispersion portion is the optimum position with respect to the operating conditions of the fuel cell.

In the conditions shown in FIG. 7, the hydrogen and oxygen fluxes reacting in the catalyst dispersion portion are described as follows.

$$\text{Hydrogen flux} \times 2 < \text{Oxygen flux}$$

Accordingly, part of $O_2$ that has permeated through the electrolyte membrane becomes hydrogen peroxide ($H_2O$) in the anode catalyst layer. However, the amount of generated hydrogen peroxide is smaller than that of the electrolyte membrane not containing the ORR active catalyst.

Figure 8:
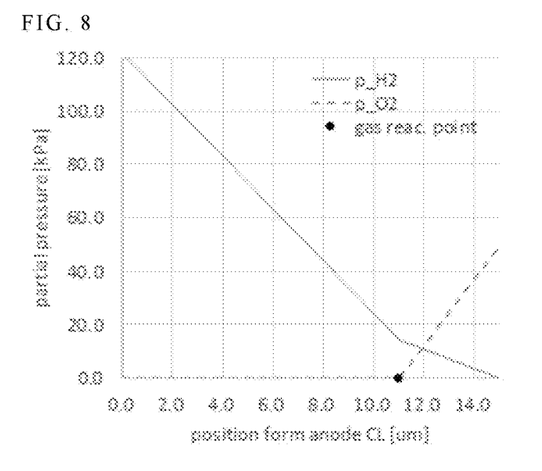
FIG. 8 is a graph showing an example of the case where the catalyst dispersion portion is located on the anode side than in the case where the position of the catalyst dispersion portion is the optimum position with respect to the operating conditions of the fuel cell.

FIG. 8 is a graph showing an example of the case where the catalyst dispersion portion is located on the anode side than in the case where the position of the catalyst dispersion portion is the optimum position with respect to the operating conditions of the fuel cell.

In the conditions shown in FIG. 8, the hydrogen and oxygen fluxes reacting in the catalyst dispersion portion are described as follows.

$$\text{Hydrogen flux} \times 2 > \text{Oxygen flux}$$

Accordingly, there is no $O_2$ permeating through the anode catalyst layer, and hydrogen peroxide is not generated in the anode catalyst layer, therefore. However, the environment of the catalyst dispersion portion becomes a $H_2$-rich environment. Accordingly, part of $O_2$ is reduced by two electrons, thereby generating hydrogen peroxide. Also, the amount of hydrogen peroxide generated in the catalyst dispersion portion is larger than the amount of hydrogen peroxide generated in the anode catalyst layer of a membrane electrode assembly using an electrolyte membrane not containing the ORR active catalyst.

In the cells of the fuel cell stack, the oxygen partial pressure and the hydrogen partial pressure decrease from the supply holes toward the discharge holes. Accordingly, it is not easy to satisfy the equation (1) over the whole area of the cells.

In addition, even when the cells are in any shape, there is a region with severe chemical deterioration in the plane.

Various forms of gas flow in each unit fuel cell such as a straight flow path, a serpentine flow path, a counter flow, a parallel flow and so on, are conceivable. Accordingly, the oxygen partial pressure distribution of the electrode surface also varies. Accordingly, the target hydrogen partial pressure value varies depending on the position of each power generation surface.

Accordingly, it is not easy to control the hydrogen partial pressure to a local target hydrogen partial pressure.

Also, the local target hydrogen partial pressure can be brought close to the actual hydrogen partial pressure by causing the catalyst addition position ($t\_cat$) of the electrolyte membrane vary among the cells of the fuel cell stack. However, the process of producing the electrolyte membrane becomes complicated to cause an increase in cost.

On the other hand, in an actual use environment, chemical deterioration does not uniformly progress in the electrode surface of each unit fuel cell, and the position at which leakage occurs is often predetermined.

If it is possible to control the hydrogen partial pressure relative to the oxygen partial pressure at the position where leakage is likely to occur, it is possible to suppress chemical deterioration at the position where leakage is likely to occur. Accordingly, the durability of the stack can be enhanced.

Accordingly, in the disclosed embodiments, an estimate for a region where the stress of chemical deterioration is relatively large in the electrode surface, may be used as an oxygen partial pressure to be substituted into the equation (1).

The oxygen partial pressure estimator may estimate the oxygen partial pressure of a region where the stress of chemical deterioration is relatively large in the cathode, and the controller may substitute the oxygen partial pressure estimated by the oxygen partial pressure estimator into the equation (1) to calculate the target hydrogen partial pressure.

Figure 9:
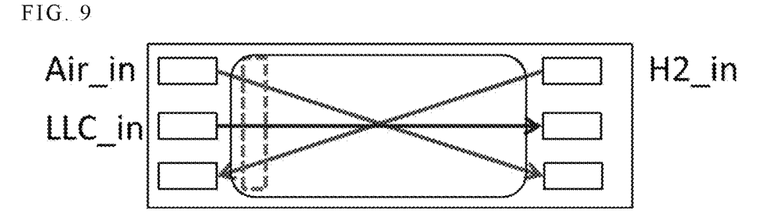
FIG. 9 is a schematic diagram showing a cell plane example.

FIG. 9 is a schematic diagram showing a cell plane example. In FIG. 9, "Air_in" means the oxidant gas supply hole; "H2_in" means the fuel gas supply hole; and "LLC_in" means the refrigerant supply hole. A region surrounded by a dashed line is a region susceptible to chemical deterioration.

Figure 10:
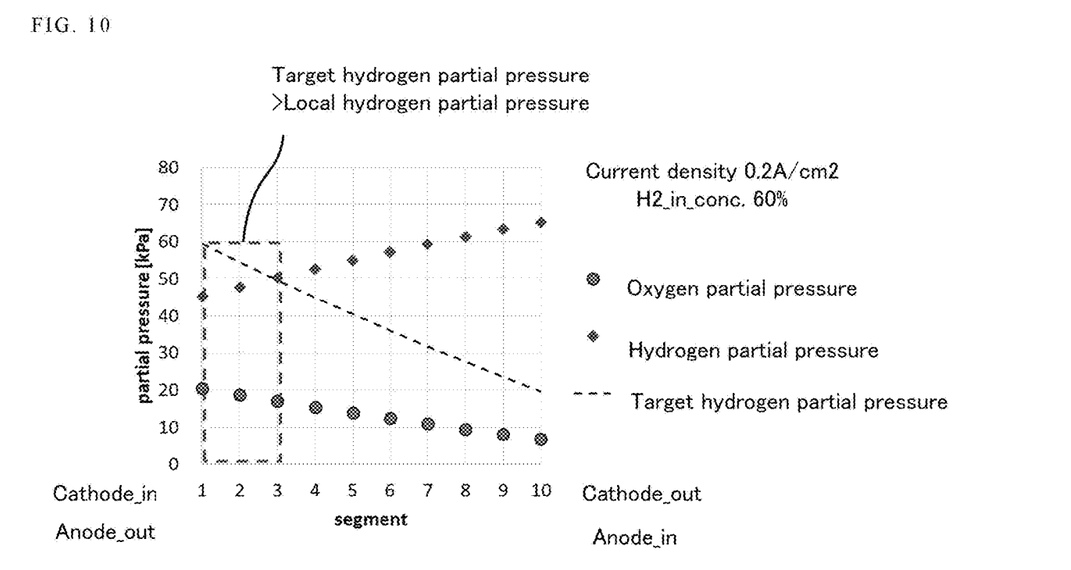
FIG. 10 is a graph showing an example of the relationship between the position of the catalyst in the thickness direction from the anode in the electrolyte membrane, the oxygen partial pressure, and the hydrogen partial pressure.

FIG. 10 is a graph showing an example of the relationship between the position of the catalyst in the thickness direction from the anode in the electrolyte membrane, the oxygen partial pressure, and the hydrogen partial pressure.

For example, when the fuel cell system of the disclosed embodiments is a fuel cell system in which the position where leakage always occurs after the durability test in an actual use environment, is the cathode inlet region, the target hydrogen partial pressure is determined based on the oxygen partial pressure at the position, and the hydrogen partial pressure at the position may be controlled to the target hydrogen partial pressure.

For example, the vicinity of the cooling water outlet is easily deteriorated since it suffers high temperature. Accordingly, the target hydrogen partial pressure may be obtained based on the oxygen partial pressure at the position, and the hydrogen partial pressure at the position may be controlled to the target hydrogen partial pressure.

By using the estimated value of the region where the stress of chemical deterioration is relatively large in the electrode surface as the oxygen partial pressure substituted into the equation (1), the cathode can exert the most effective effect in the region where the chemical deterioration is relatively severe. Accordingly, the occurrence of leakage due to the chemical deterioration can be suppressed, and the durability of the fuel cell can be enhanced.

The controller determines whether or not the target hydrogen partial pressure is lower than the lower limit hydrogen partial pressure.

When the target hydrogen partial pressure is determined to be lower than the lower limit hydrogen partial pressure, the controller increases the oxygen partial pressure of the cathode. When the target hydrogen partial pressure is lower than the lower limit hydrogen partial pressure, the target hydrogen partial pressure can be increased by increasing the oxygen partial pressure of the cathode. Accordingly, the oxygen partial pressure of the cathode is increased so that the target hydrogen partial pressure is the lower limit hydrogen partial pressure or more.

When the target hydrogen partial pressure is determined to be the lower limit hydrogen partial pressure, the controller maintains the oxygen partial pressure of the cathode, and it maintains the hydrogen partial pressure of the anode.

When the target hydrogen partial pressure is determined to be higher than the lower limit hydrogen partial pressure, the controller controls the hydrogen partial pressure of the anode to reach the target hydrogen partial pressure. When the target hydrogen partial pressure is higher than the lower limit hydrogen partial pressure, even though the fuel efficiency is deteriorated, it is prioritized to suppress the deterioration of the electrolyte membrane.

The target hydrogen partial pressure may be set as a hydrogen partial pressure at which the deterioration of the electrolyte membrane does not occur.

The lower limit hydrogen partial pressure may be set as the minimum partial pressure for preventing hydrogen deficiency from occurring, in consideration of the variation in fuel gas distribution between the cells or in each cell, and the reaction distribution of the fuel gas.

The lower limit hydrogen partial pressure may be appropriately set again depending on the operating conditions of the fuel cell, it may be a constant. The lower limit hydrogen partial pressure may be set in advance to a value corresponding to the position of the catalyst dispersion portion, and it is not needed to calculate the lower limit hydrogen partial pressure every time.

Figure 11:
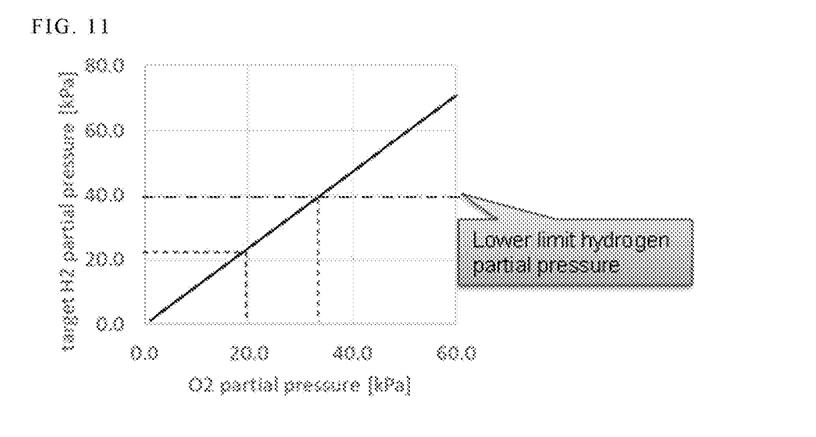
FIG. 11 is a graph showing an example of the relationship between the oxygen partial pressure and the target hydrogen partial pressure.

FIG. 11 is a graph showing an example of the relationship between the oxygen partial pressure and the target hydrogen partial pressure.

As shown in FIG. 11, for example, when the fuel cell is operated at an oxygen partial pressure of 20 kPa, the hydrogen partial pressure suitable for suppressing the deterioration of the electrolyte membrane is 22 kPa. However, if the lower limit hydrogen partial pressure for preventing hydrogen deficiency is 40 kPa, the hydrogen partial pressure cannot be decreased to 40 kPa or less, and the deterioration of the electrolyte membrane progresses, therefore. By increasing the oxygen partial pressure, the hydrogen partial pressure suitable for suppressing the deterioration of the electrolyte membrane is also increased. Accordingly, the deterioration of the electrolyte membrane can be suppressed with preventing the hydrogen deficiency of the fuel cell.

Figure 12:
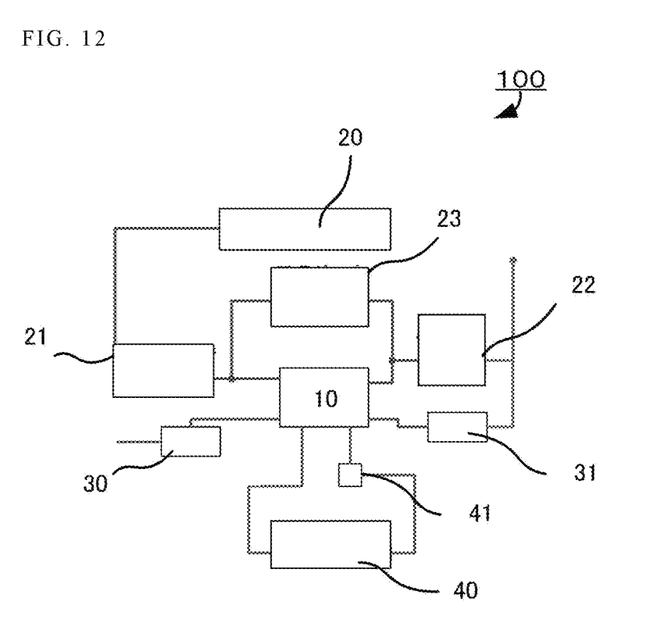
FIG. 12 is a schematic configuration diagram showing an example of the fuel cell system of the disclosed embodiments.

FIG. 12 is a schematic configuration diagram showing an example of the fuel cell system of the disclosed embodiments.

The fuel cell system 100 illustrated in FIG. 12 includes a fuel cell 10, a fuel gas supplier 20, a fuel gas supply valve 21, a fuel off-gas discharge valve 22, a circulation pump 23, an oxidant gas supplier 30, an oxidant gas pressure control valve 31, a cooler 40, a cooling water pump 41, a controller (not shown), an oxygen partial pressure estimator (not shown), and a hydrogen partial pressure estimator (not shown).

Figure 13:
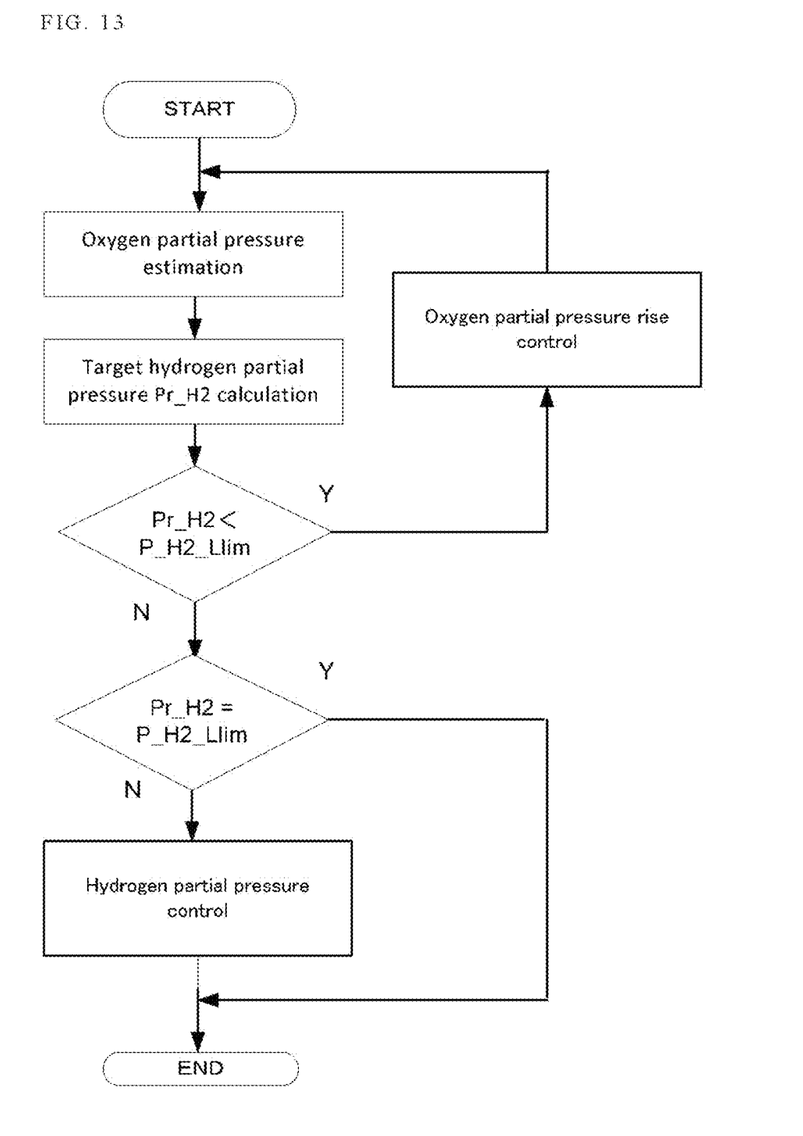
FIG. 13 is a flowchart showing an example of the control performed by the fuel cell system of the disclosed embodiments.

FIG. 13 is a flowchart showing an example of the control performed by the fuel cell system of the disclosed embodiments.

First, the fuel cell is started.

Then, the oxygen partial pressure estimator estimates the oxygen partial pressure of the cathode of the fuel cell.

The controller calculates a target hydrogen partial pressure from the obtained oxygen partial pressure using the equation (1).

The controller determines whether or not the calculated target hydrogen partial pressure (Pr_H2) is lower than a preset lower limit hydrogen partial pressure (P_H2_Llim). When the target hydrogen partial pressure is determined to be less than the lower limit hydrogen partial pressure, the controller increases the oxygen partial pressure of the cathode.

When the target hydrogen partial pressure is determined to be the lower limit hydrogen partial pressure, the controller maintains the oxygen partial pressure of the cathode, and it maintains the hydrogen partial pressure of the anode.

When the target hydrogen partial pressure is determined to be higher than the lower limit hydrogen partial pressure, the controller controls the hydrogen partial pressure of the anode to reach the target hydrogen partial pressure. As the hydrogen partial pressure, the value estimated by the hydrogen partial pressure estimator may be used.

The hydrogen partial pressure in the fuel cell can be controlled by the following methods, for example.

When the opening degree of the fuel off-gas discharge valve is decreased, the concentration of nitrogen permeated from the cathode is increased. Accordingly, the hydrogen partial pressure can be decreased. When the fuel off-gas discharge valve is an ON-OFF valve, the concentration of the nitrogen permeated from the cathode is increased by decreasing the opening frequency. Accordingly, the hydrogen partial pressure can be decreased.

When the circulation flow rate by the circulation pump is increased, a hydrogen concentration gradient generated from the upstream side to the downstream side in the cell becomes small. Accordingly, the hydrogen partial pressure on the inlet side can be decreased, and the hydrogen partial pressure on the outlet side can be increased.

When the opening degree of the fuel gas supply valve is decreased, the anode gas pressure is decreased. Accordingly, the hydrogen partial pressure can be decreased. When the fuel gas supply valve is an ON-OFF valve, the anode gas pressure is decreased by decreasing the opening frequency. Accordingly, the hydrogen partial pressure can be decreased.

These control methods may be combined.

The oxygen partial pressure in the fuel cell can be controlled by the following methods, for example.

When the opening degree of the oxidant gas pressure control valve is decreased, the cathode gas pressure is increased. Accordingly, the oxygen partial pressure can be increased.

When the flow rate of air supplied from the air compressor is increased, an oxygen concentration gradient generated from the upstream side to the downstream side in the cell becomes small. Accordingly, the oxygen partial pressure on the outlet side can be increased.

The above control methods may be combined.

REFERENCE SIGNS LIST

1. Anode catalyst layer
2. Electrolyte membrane
3. Cathode catalyst layer

4. Catalyst dispersion portion
10. Fuel cell
20. Fuel gas supplier
21. Fuel gas supply valve
22. Fuel off-gas discharge valve
23. Circulation pump
30. Oxidant gas supplier
31. Oxidant gas pressure control valve
40. Cooler
41. Cooling water pump
100. Fuel cell system

The invention claimed is:

1. A fuel cell system comprising:
a fuel cell,
an oxidant gas supplier configured to supply oxygen-containing oxidant gas to a cathode of the fuel cell,
a fuel gas supplier configured to supply hydrogen-containing fuel gas to an anode of the fuel cell,
an oxygen partial pressure estimator configured to estimate an oxygen partial pressure of the cathode of the fuel cell,
a hydrogen partial pressure estimator configured to estimate a hydrogen partial pressure of the anode of the fuel cell, and
a controller,
wherein the fuel cell includes one or more unit fuel cells;
wherein the one or more unit fuel cells include a membrane electrode assembly;
wherein the membrane electrode assembly includes an anode including an anode catalyst layer, an electrolyte membrane, and a cathode including a cathode catalyst layer in this order;
wherein the electrolyte membrane includes a catalyst dispersion portion in the electrolyte membrane, which is arranged in parallel with the anode catalyst layer and the cathode catalyst layer in a layered manner;
wherein the catalyst dispersion portion contains a catalyst;
wherein the controller calculates a target hydrogen partial pressure by the following equation (1):

Target hydrogen partial pressure=[2×Oxygen permeation coefficient in electrolyte membrane thickness direction×{Distance from the anode catalyst layer to the catalyst dispersion portion÷(Electrolyte membrane thickness−Distance from the anode catalyst layer to the catalyst dispersion portion)}×Oxygen partial pressure]÷Hydrogen permeation coefficient in the electrolyte membrane thickness direction; Equation (1):

and
wherein the controller controls the hydrogen partial pressure of the anode to the target hydrogen partial pressure.

2. The fuel cell system according to claim 1,
wherein the controller determines whether or not the target hydrogen partial pressure is lower than a lower limit hydrogen partial pressure;
wherein, when the target hydrogen partial pressure is determined to be lower than the lower limit hydrogen partial pressure, the controller increases the oxygen partial pressure of the cathode;
wherein, when the target hydrogen partial pressure is determined to be the lower limit hydrogen partial pressure, the controller maintains the oxygen partial pressure of the cathode, and it maintains the hydrogen partial pressure of the anode; and
wherein, when the target hydrogen partial pressure is determined to be higher than the lower limit hydrogen partial pressure, the controller controls the hydrogen partial pressure of the anode to reach the target hydrogen partial pressure.

* * * * *